Oct. 5, 1948.    J. L. CLARKSON    2,450,501
CONVEYER CHAIN
Filed April 4, 1945    2 Sheets-Sheet 1
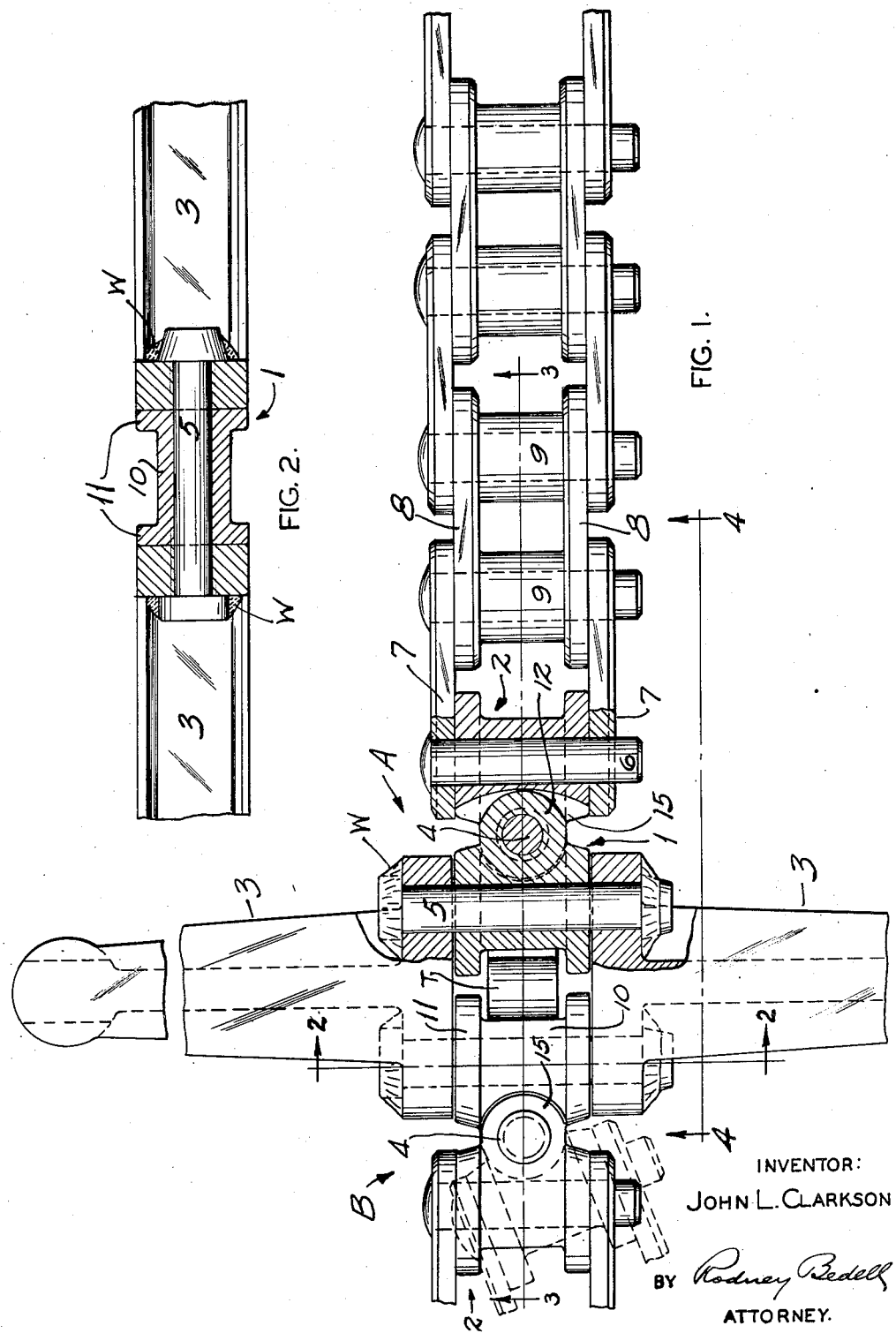
INVENTOR:
JOHN L. CLARKSON
BY Rodney Bedell
ATTORNEY.

Oct. 5, 1948.         J. L. CLARKSON         2,450,501
                       CONVEYER CHAIN
Filed April 4, 1945                    2 Sheets-Sheet 2

INVENTOR:
JOHN L. CLARKSON
BY Rodney Bedell
ATTORNEY.

Patented Oct. 5, 1948

2,450,501

UNITED STATES PATENT OFFICE 2,450,501

CONVEYER CHAIN

John L. Clarkson, Nashville, Ill.

Application April 4, 1945, Serial No. 586,559

7 Claims. (Cl. 198—176)

The invention relates to conveyor chains and comprises novel features of universal joint structure and of flight and chain assembly structure.

One object of the invention is to prolong the useful life of chains of the type described without increasing their overall width or thickness which would require change in the driving and other associated mechanism.

Another object is to prolong the useful life of chains of the type described by utilizing the flight as a connector between adjacent chain units and by constructing the flight so as to prevent the customary frequent breakage of elements connecting the flight to the chain.

Another object is to simplify the construction of chains of the type described.

These and other detail objects as will be apparent from the following description are attained by the structure illustrated in the accompanying drawings, in which—

Figure 1 is a top view of a length of conveyor chain showing the essential parts of a pair of flights at opposite sides of the chain. A portion of the structure is sectioned along the line 1—1 of Figure 3.

Figure 2 is a transverse vertical section taken on the line 2—2 of Figure 1.

Figure 3:
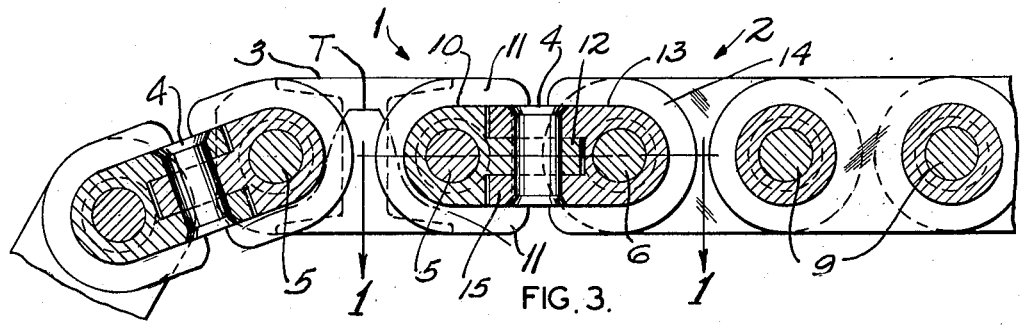
Figure 4:
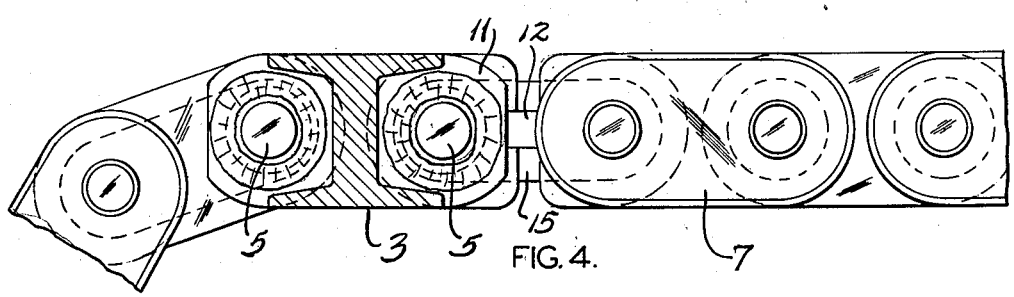

Figures 3 and 4 are longitudinal vertical sections taken on the lines 3—3 and 4—4 of Figure 1.

Figure 5:
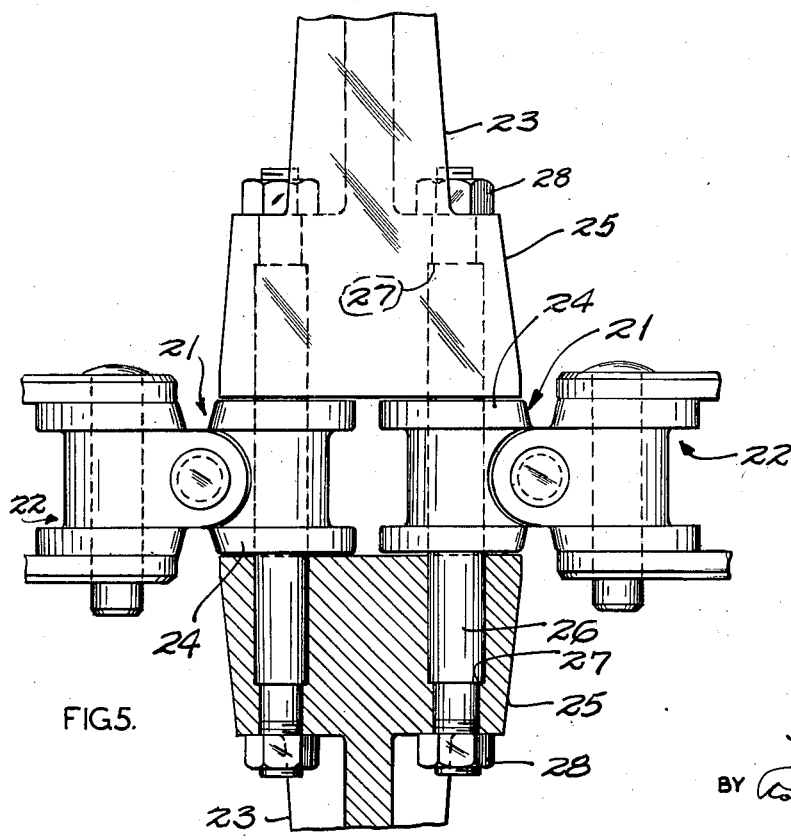

Figure 5 is a top view of a flight and chain assembly corresponding generally to Figure 1 but illustrating another form of the invention.

The chain and flight assembly comprises two universal joint units A and B and a pair of flights 3 extending outwardly from the sides of the chain. Upright pins 4 pivotally connect the two elements 1 and 2 of each universal joint unit. Each element 1 is pivotally connected to flights 3 by a horizontally disposed pin 5. Each element 2 is pivotally connected by horizontal pins 6 to chain links 7 which, with cooperating links 8 and rollers 9, form ordinary chain structure between successive flight and universal joint assemblies.

Each element 1 has a central longitudinal portion 10 of relatively shallow depth and side flanges 11 of relatively greater depth. One end of portion 10 is rounded and apertured axially of its rounding to form a sleeve to receive pin 5, and the other end of portion 10 is flattened to form a tongue 12 which is apertured normal to its flat faces to receive pin 4 which has its axis extending in a direction transverse of the direction of the axis of pin 5. Flanges 11 project upwardly and downwardly and outwardly of the rounded end and terminate a substantial distance inwardly from the outer end of tongue 12.

Each element 2 has a central longitudinal portion 13 of relatively shallow depth and side flanges 14 of relatively greater depth. One end of portion 13 is rounded and apertured axially of its rounding to form a sleeve to receive pin 6 and the other end of portion 13 is slotted to form spaced jaws 15, adapted to receive between them the tongue 12 of the associated element. Tongue 12 and jaws 15 are apertured for pin 4. Flanges 14 project upwardly and downwardly and outwardly of the rounded end and terminate a substantial distance inwardly from the outer ends of the jaws 15.

Preferably, but not essentially, elements 1 and 2 have the same overall width as rollers 9 plus links 8 and the element (and universal joint unit) is thereby adapted for ready assembly with intermediate lengths of ordinary standard conveyor chain. The flanges of elements 1 and 2 have the same depth as links 7 and 8 and the units and flight bases assembled therewith readily fit over the sprocket wheel tooth T. Elements 1 and 2, although forming a universal joint structure, are equivalent in strength to the intermediate ordinary standard chain link structure and are not subject to failure as are interconnected elements frequently used in universal joints. The flanges at the sides of the elements to which the flights are attached provide large, flat, direct contacts or seats for the flights. Thus play between these parts is reduced, resulting in less wear and longer useful life of the assembly. When, as shown at W, the flights at opposite sides of the chain are rigidly interconnected by welding the retaining pins to the flights, there is a further decrease in the amount of play and wear and consequent increase in the useful life of the assembly.

In assembling the flight and associated elements, a filler (not shown) may be placed between the opposed flights, the width of the filler being slightly greater than the overall width of the elements to which the flights are attached, then the retaining pins are applied and riveted over, thus better filling the pin apertures in the flights, and also avoiding binding of the elements between the flights.

Figure 5 illustrates another form of the invention in which the universal joint elements 21 and 22 are substantially the same as those previously described and the flights 23 are applied to the outwardly facing surfaces of the flanges 24 of elements 21, but the base 25 of each flight is much thicker than the base of each flight shown in Figure 1. Preferably the thickness of the flight substantially exceeds the overall width of elements 21, 22.

Pivot pins 26 extend through elements 21 and the flight bases 25, and the apertures therefor in the flight bases are shouldered at 27 and the projecting ends of the pins are threaded for retaining nuts 28.

With this arrangement, the blow transferred from the flight to the chain, or vice versa, when the flight strikes a heavy object, is spread over a long area of pin and the likelihood of fracture of the pin at its shoulder 27 is minimized. At the same time, there is provided the feature of making the flight readily applicable to and removable from the chain by use of nuts 28, which arrangement may be desirable in some installations.

The details of the universal joint structure not claimed herein form the subject matter of a divisional application filed August 21, 1946, Serial No. 691,956.

Obviously, it will not be essential that all the details of construction be present in every embodiment of the invention, and the details may be varied without departing from the spirit of the invention. The exclusive use of modifications coming within the scope of the claims is contemplated.

What is claimed is:

1. In a conveyor chain universal joint structure, two units arranged end to end, each comprising a pair of elements pivotally connected to swivel in one plane, adjacent elements of the two units being spaced apart to receive a sprocket tooth between them, a pair of members extending along the outer sides of and pivotally connected to the adjacent ends of said spaced elements to swivel transversely of said plane and forming the sole connection between said units, at least one of said members comprising a conveyor flight having an arm extending outwardly from the chain.

2. In a conveyor chain universal joint structure, two units arranged end to end, each comprising a pair of elements pivotally connected to swivel in one plane, adjacent elements of the two units being spaced apart to receive a sprocket tooth between them, a pair of conveyor flights extending outwardly from the opposite sides of the chain in said plane, the adjacent portions of said elements and flights having continuous apertures extending transversely of the chain, pivot pins extending through said elements and flights and journalled in said elements to provide for the swivelling of the units transversely of said plane, said pins being fixedly secured to said flights to form a structure rigid from the outer end of one flight to the outer end of the other flight.

3. In a conveyor chain, units arranged end to end but spaced apart to receive a sprocket tooth between them, each of said units having an aperture extending transversely of the length of the chain and in the end of each unit adjacent the other unit, a pivot pin journaled directly in each of said apertures and projecting outwardly from the sides of the associated unit, conveyor flights extending transversely of the chain from opposite sides thereof and each having a base extending alongside the adjacent ends of the two units, said pins extending through said bases and having their ends welded to the bases to form a structure rigid from the outer end of one flight to the outer end of the other flight.

4. In a conveyor chain universal joint structure, two units arranged end to end, each unit comprising a pair of elements and an upright pin pivotally connecting them, parallel members extending along the outer sides of one end of an element of one unit and along the outer sides of the adjacent end of one element of the other unit, transverse pins extending through the ends of said members and through the corresponding ends of the elements between them to pivotally connect said structures, at least one of said members comprising the base of a conveyor flight and being provided with an arm extending transversely of the length of the universal joint structure and between the axes of the associated pins.

5. In a conveyor chain universal joint structure, two pairs of elements arranged in alignment and having adjacent ends spaced apart to receive a sprocket tooth between them, an upright pin pivotally connecting the elements of each pair to provide for their relative swivelling in one plane, a pair of conveyor flights at the opposite sides of the chain, each flight having a base extending along the outer side faces of the end portions of said adjacent elements, and spaced horizontal pins extending through the two bases and the elements between them to pivotally connect the pairs of elements and provide for their swivelling transversely of said plane.

6. In a conveyor chain, elements arranged end to end but spaced apart to receive a sprocket tooth between them, a pivot pin extending through the end of each element adjacent the other element and projecting outwardly from each side thereof a distance exceeding the overall width of the element, the pin being shouldered near its outer end, conveyor flights extending outwardly from opposite sides of the chain and each having a base extending alongside the adjacent ends of the elements and having spaced apertures for receiving said pins, each aperture being shouldered to seat the pin shoulder, and means on the outer ends of the pins retaining the flights thereon.

7. In a conveyor chain universal joint structure, two units arranged end to end, each comprising a pair of elements pivotally connected to swivel in one plane, adjacent elements of the two units being spaced apart to receive a sprocket tooth between them, each element having a central longitudinal portion of relatively shallow depth and side flanges of relatively greater depth, a pair of members applied to the outer sides of the flanges at the adjacent ends of said spaced elements and pivotally connected to the adjacent ends of said spaced elements to provide for their relative swivelling movement transversely of said plane and forming the sole connection between said units, at least one of said members having a depth and length corresponding to that of the adjacent flanges and having a conveyor flight arm extending outwardly from the chain.

JOHN L. CLARKSON.

REFERENCES CITED

The following references are of record in the file of this patent:

UNITED STATES PATENTS

| Number | Name | Date |
|---|---|---|
| 907,548 | Wyman | Dec. 22, 1908 |
| 1,558,550 | Joy | Oct. 27, 1925 |
| 1,765,945 | Shaw | June 24, 1930 |
| 1,770,650 | Levin | July 15, 1930 |
| 2,155,306 | Ferguson | Apr. 18, 1939 |
| 2,365,866 | Dalrymple | Dec. 26, 1944 |
| 2,372,925 | Ball | Apr. 3, 1945 |